United States Patent
Nahas et al.

(10) Patent No.: US 10,280,284 B2
(45) Date of Patent: May 7, 2019

(54) BORON NITRIDE AGGREGATE POWDER

(71) Applicant: SAINT-GOBAIN CENTRE DE RECHERCHES ET D'ETUDES EUROPEEN, Courbevoie (FR)

(72) Inventors: Nabil Nahas, Marseilles (FR); Elodie Bahon, L'isle sur la Sorgue (FR); Yves Boussant-Roux, Montfavet (FR)

(73) Assignee: SAINT-GOBAIN CENTRE DE RECHERCHES ET D'ETUDES EUROPEEN, Courbevoie (FR)

( * ) Notice: Subject to any disclaimer, the term of this patent is extended or adjusted under 35 U.S.C. 154(b) by 0 days.

(21) Appl. No.: 15/736,920

(22) PCT Filed: Jun. 16, 2016

(86) PCT No.: PCT/FR2016/051468
§ 371 (c)(1),
(2) Date: Dec. 15, 2017

(87) PCT Pub. No.: WO2016/203164
PCT Pub. Date: Dec. 22, 2016

(65) Prior Publication Data
US 2018/0362726 A1    Dec. 20, 2018

(30) Foreign Application Priority Data
Jun. 17, 2015    (FR) ..................... 15 55543

(51) Int. Cl.
| | | |
|---|---|---|
| *C08K 3/38* | (2006.01) | |
| *C08K 9/08* | (2006.01) | |
| *C09K 5/14* | (2006.01) | |
| *C04B 14/32* | (2006.01) | |
| *C04B 20/00* | (2006.01) | |
| *C04B 26/04* | (2006.01) | |
| *C04B 26/08* | (2006.01) | |
| *C04B 26/10* | (2006.01) | |
| *C04B 26/32* | (2006.01) | |
| *C04B 38/00* | (2006.01) | |
| *C01B 21/064* | (2006.01) | |
| *C04B 103/00* | (2006.01) | |
| *C04B 111/00* | (2006.01) | |
| *C04B 35/583* | (2006.01) | |
| *C04B 35/626* | (2006.01) | |

(52) U.S. Cl.
CPC .............. *C08K 3/38* (2013.01); *C01B 21/064* (2013.01); *C01B 21/0648* (2013.01); *C04B 26/04* (2013.01); *C04B 26/08* (2013.01); *C04B 26/10* (2013.01); *C04B 26/32* (2013.01); *C04B 35/583* (2013.01); *C04B 35/6261* (2013.01); *C04B 35/6262* (2013.01); *C04B 35/6268* (2013.01); *C04B 35/62695* (2013.01); *C04B 38/009* (2013.01); *C08K 9/08* (2013.01); *C09K 5/14* (2013.01); *C01P 2002/76* (2013.01); *C01P 2004/32* (2013.01); *C01P 2004/50* (2013.01); *C01P 2004/60* (2013.01); *C01P 2006/10* (2013.01); *C01P 2006/16* (2013.01); *C01P 2006/80* (2013.01); *C01P 2006/90* (2013.01); *C04B 2111/00465* (2013.01); *C04B 2111/00844* (2013.01); *C04B 2235/386* (2013.01); *C04B 2235/528* (2013.01); *C04B 2235/5427* (2013.01); *C04B 2235/5436* (2013.01); *C04B 2235/608* (2013.01); *C04B 2235/72* (2013.01); *C04B 2235/728* (2013.01); *C04B 2235/767* (2013.01); *C08K 2003/385* (2013.01); *C08K 2201/001* (2013.01); *C08K 2201/002* (2013.01)

(58) Field of Classification Search
CPC ................ C08K 3/38; C08K 2003/382; C08K 2003/385; C01B 21/064; C01B 21/0648
See application file for complete search history.

(56) References Cited

U.S. PATENT DOCUMENTS

| | | | | |
|---|---|---|---|---|
| 5,332,629 A | * | 7/1994 | Sumiya ................ | C04B 35/5831 257/E23.113 |
| 2003/0073769 A1 | | 4/2003 | Pujari et al. | |
| 2008/0076856 A1 | | 3/2008 | Zhong et al. | |
| 2012/0114905 A1 | | 5/2012 | Engler et al. | |

(Continued)

FOREIGN PATENT DOCUMENTS

| | | |
|---|---|---|
| EP | 2 966 036 A1 | 1/2016 |
| JP | 2014-028749 A | 2/2014 |

(Continued)

OTHER PUBLICATIONS

Machine translated English language equivalent of JP 2016-115808 (2016, 18 pages).*

(Continued)

*Primary Examiner* — Brieann R Johnston
(74) *Attorney, Agent, or Firm* — Pillsbury Winthrop Shaw Pittman LLP

(57) ABSTRACT

A powder essentially composed of aggregates based on boron nitride, the powder exhibiting an overall chemical composition, as percentages by weight, including between 40 and 45% of boron, between 53 and 57% of nitrogen, less than 400 ppm by weight of calcium, less than 5 %, in total, of other elements and more than 90% of boron nitride, limit included, as percentage by weight and on the basis of the combined crystalline phases, a mean circularity of greater than or equal to 0.90, a median pore size of less than or equal to 1.5 μm and an apparent porosity of less than or equal to 55%.

26 Claims, No Drawings

(56) References Cited

U.S. PATENT DOCUMENTS

| | | | | |
|---|---|---|---|---|
| 2016/0060112 A1* | 3/2016 | Nishi | ............... | C08K 3/38 252/74 |
| 2017/0362440 A1* | 12/2017 | Bahon | ............... | C04B 35/6262 |
| 2018/0201818 A1* | 7/2018 | Otsuka | ............... | C08L 101/00 |

FOREIGN PATENT DOCUMENTS

| | | | |
|---|---|---|---|
| JP | 2016115808 A | * | 6/2016 |
| WO | WO 03/013845 A1 | | 2/2003 |
| WO | WO 2008/088774 A2 | | 7/2008 |
| WO | WO 2014/136959 A1 | | 9/2014 |

OTHER PUBLICATIONS

International Search Report as issued in International Patent Application No. PCT/FR2016/051468, dated Aug. 30, 2016.
International Preliminary Report on Patentability and the International Search Report as issued in International Patent Application No. PCT/FR2016/051468, dated Dec. 19, 2017.

* cited by examiner

BORON NITRIDE AGGREGATE POWDER

CROSS-REFERENCE TO RELATED APPLICATIONS

This application is the U.S. National Stage of PCT/FR2016/051468, filed Jun. 16, 2016, which in turn claims priority to French patent application number 1555543 filed Jun. 17, 2015. The content of these applications are incorporated herein by reference in their entireties.

The invention relates to powders formed of aggregates based on boron nitride and to their use in a polymer-ceramic or particulate-filled polymer composite, that is to say as filler in a polymer matrix.

The use of powders formed of inorganic particles as filler in polymers is well known from the state of the art, this filler making it possible to contribute additional functionalities, in particular depending on the properties of the material constituting the filler. These functionalities are, for example, the increase in the thermal conductivity and/or in the hardness and/or in the density of the polymer. The particulate-filled polymers thus obtained have applications in particular in a great many technical fields, such as thermal interface materials, such as, for example, thermal greases or heat sinks, or else printed circuit boards.

In particular, boron nitride (BN) powders are known to be used as filler in polymers. Mention may be made, inter alia, of the publications US2003/0073769, US2008/0076856, WO2008/088774 and WO2014/136959 in this field. The use of a BN powder is known in particular to increase the thermal conductivity of the polymer, which is particularly desired in thermal interface material applications, such as thermal greases.

Application WO2014/136959 relates to a boron nitride powder appropriate for use in a resin composition for transmitting heat from a heat-producing electronic component. This boron nitride powder contains boron nitride particles each consisting of hexagonal primary boron nitride particles combined together. The powder formed of BN aggregates exhibits a mean sphericity of greater than 0.70, a mean size of between 20 μm and 100 μm, a porosity of between 50% and 80%, a mean pore diameter of between 0.10 and 2.0 μm, a maximum pore size of less than 10 μm and a calcium content of between 500 ppm and 5000 ppm. In this patent application, it is furthermore indicated that the presence of a minimum calcium content is essential in order to obtain the required properties. In particular, it is indicated that the said calcium content has to be greater than 500 ppm for the aggregates to exhibit sufficient sintering to withstand the shaping stresses during the manufacture of the particulate-filled polymer. However, the tests carried out by the Applicant Company, as reported subsequently, have shown that it is possible to obtain aggregates for which the wear by attrition is far superior to that of the aggregates in accordance with the teaching of this publication.

One of the main objects of the present invention is thus to provide a powder formed of aggregates exhibiting a low wear by attrition, additionally making it possible to obtain, once mixed with different polymer matrices, a good thermal conductivity.

The present invention relates to a powder formed of aggregates based on BN, and also to the aggregates themselves, making it possible to solve all of the problems described above.

More specifically, the present invention relates first of all to a powder (or a mixture) essentially composed of aggregates based on boron nitride, the said powder exhibiting:

a) the following overall chemical composition, as percentages by weight:
   between 40 and 45% of boron, limits included,
   between 53 and 57% of nitrogen, limits included,
   less than 5%, in total, of other elements,
   a calcium content of less than 400 ppm by weight;
b) a structural composition comprising more than 90% of boron nitride, limit included, as percentage by weight and on the basis of the combined crystalline phases present in the said powder,
c) the following physical characteristics:
   a mean circularity of greater than or equal to 0.90,
   a median pore size of less than or equal to 1.5 μm,
   an apparent porosity of less than or equal to 55%.

In the present description, all the percentages are by weight, unless expressly specified.

Within the meaning of the present invention, the elements other than O, C and N of the said chemical composition, in particular the boron and the calcium, are measured conventionally on the powder formed of aggregates by ICP-AES.

Within the meaning of the present invention, the elements O, C and N of the said chemical composition are measured conventionally on the powder formed of aggregates by infrared spectrometry for the elements O and C and by thermal conductivity for the element N, for example on a Leco series TC-436DR device for the elements N and O and on a Leco series SC-144DR device for the element C.

Within the meaning of the present invention, the said structural composition is obtained conventionally from the powder formed of aggregates by X-ray diffraction and Rietveld refinement.

The term "essentially composed" is understood to mean that the very great majority of the said powder is composed of the said aggregates based on boron nitride, without, however, excluding the presence of particles other than aggregates based on boron nitride, such as elementary boron nitride particles, the latter, however, being necessarily in a very small amount, within the meaning of the present invention. It is more particularly understood that the powder contains more than 90% by weight, preferably more than 95% by weight, indeed even more than 99% by weight, of the said aggregates based on boron nitride. Of course, according to one possible embodiment, the powder is composed solely of aggregates based on boron nitride, aside from unavoidable impurities.

Within the meaning of the present invention:
   the term "aggregate" is conventionally understood to mean a collection of particles comprising BN, the said particles being assembled together and strongly bonded in a rigid fashion, in particular by sintering, so as to constitute the individualized grains, known as aggregates, which constitute the said powder;
   in contrast, the term "agglomerate" is understood to mean a collection of particles which are weakly bonded and which are easily dispersible.

According to different preferred embodiments of the present invention, which can very obviously be combined, if appropriate:
in the said chemical composition:
   the content by weight of boron is greater than or equal to 41%,
   the content by weight of boron is less than or equal to 44%,
   the content by weight of nitrogen is greater than or equal to 54%,
   the content by weight of nitrogen is less than or equal to 56%, the calcium content is less than 300 ppm by weight, preferably less than 200 ppm by weight, preferably less than 100 ppm by weight and more preferably less than 50 ppm by weight, in a preferred embodiment, the content by weight of elements other than those described in the said preceding elemental chemical formulation is less than 4%, preferably less than 2%, preferably less than 1%, preferably less than 0.5% and preferably less than 0.1%. In the said embodiment, these elements are preferably impurities, that is to say elements not deliberately introduced, for example introduced by the starting materials used in the starting filler, such as the elements O, C, Mg, Fe, Si, Na and K, preferably, the oxygen content in the powder is less than 5000 ppm by weight, preferably less than 2000 ppm by weight, indeed even less than 1000 ppm by weight, in a specific embodiment, the said other elements include an additive for the sintering of the boron nitride, in an amount preferably of greater than or equal to 0.5%, preferably of greater than 1%, and of less than 4%, preferably of less than 3% and preferably of less than 2%, the additive for the sintering of the boron nitride is chosen from $LaB_6$; oxides of rare earth metals, of elements from Groups 3 and 4 of the Periodic Table of the Elements and of their mixtures; nitrides of the elements from Group of the Periodic Table of the Elements; and their mixtures. Preferably, the said sintering additive is chosen from $LaB_6$, $Y_2O_3$, the nitrides of the elements Ti, Zr, Si and Al and their mixtures. Preferably, the said sintering additive is chosen from $LaB_6$, $Y_2O_3$, the nitrides of the elements Ti, Si and Al and their mixtures, the powder according to the invention very preferably contains a content of boron oxide $B_2O_3$ of less than 5%, preferably of less than 2%, more preferably of less than 1% or even of less than 0.5% and very preferably of less than 0.1%.

The boron oxide $B_2O_3$ content of the powder according to the invention is measured conventionally by mannitol titration.

Within the meaning of the present invention:

the term "additive for the sintering" of boron nitride is conventionally understood to mean a compound which facilitates the sintering of the said boron nitride, for example by reducing the temperature necessary for the said sintering, by improving the densification or by limiting the crystal growth;

the term "rare earth metal" is conventionally understood to mean an element from the group of the lanthanides plus scandium Sc and yttrium Y;

the term "lanthanide" is conventionally understood to mean an element with an atomic number of between 57 (lanthanum) and 71 (lutetium) of the Periodic Table.

According to preferred embodiments of the present invention:

the said structural composition comprises more than 95%, preferably more than 98%, of boron nitride, as a percentage by weight and on the basis of the combined crystalline phases present in the said powder, the said structural composition comprises more than 90%, preferably more than 95% and preferably more than 98% of boron nitride, as percentage by weight and on the basis of the weight of the said powder, the boron nitride is present for more than 60%, preferably for more than 70%, preferably for more than 80%, indeed even for substantially 100%, under a hexagonal structure, as percentage by weight and on the basis of the crystalline boron nitride phases present in the said powder.

In the said physical characteristics:

the powder formed of aggregates exhibits a mean circularity of greater than or equal to 0.92, preferably of greater than or equal to 0.93, indeed even greater than or equal to 0.94, indeed even of greater than or equal to 0.95.

In order to evaluate the circularity "Ci" of an aggregate P, the perimeter $P_D$ of the disc D exhibiting an area equal to the area $A_p$ of the aggregate P in a photograph of this aggregate is determined. Furthermore, the perimeter $P_r$ of this aggregate is determined. The circularity is equal to the $P_D/P_r$ ratio, i.e.

$$Ci = \frac{2*\sqrt{\pi A_p}}{Pr}.$$

The more elongated the aggregate in shape, the lower the circularity.

The mean circularity of a powder formed of aggregates within the meaning of the present invention corresponds to the arithmetic mean of the different values obtained for the population of aggregates constituting the powder.

Any measurement method known for evaluating the circularity can be envisaged and in particular a manual or automated observation of photographs of the aggregates, for example on a Morphologi® G3S device sold by Malvern. Such a device also makes it possible to determine the mean circularity of a powder formed of aggregates, the powder formed of aggregates exhibits a median pore size of less than or equal to 1.3 µm, preferably of less than or equal to 1.2 µm, preferably of less than or equal to 1.0 µm, preferably of less than or equal to 0.8 µm, preferably of less than or equal to 0.5 µm, preferably of less than or equal to 0.3 µm, preferably of less than or equal to 0.25 µm, preferably of less than or equal to 0.2 µm. Preferably, the powder formed of aggregates exhibits a median pore size of greater than 0.05 µm.

The median size of the pores of the powder formed of aggregates is evaluated by mercury porosimetry according to Standard ISO 15901-1. The term "median size" of a collection of pores, denoted $D_{50}$, refers to the size dividing the pores of this collection into a first population and a second population equal in volume, this first population and this second population comprising only pores respectively exhibiting a size greater than or less than the said median size.

the powder formed of aggregates exhibits an apparent porosity of less than 53%, preferably of less than 50%, preferably of less than 49%, indeed even of less than 47%, indeed even of less than 45%.

the powder formed of aggregates exhibits an apparent porosity of greater than 25%, indeed even of greater than 30%, indeed even of greater than 35%.

The apparent porosity of the powder formed of aggregates is evaluated conventionally by mercury porosimetry according to Standard ISO 15901-1.

According to other preferred embodiments of the present invention:

the powder formed of aggregates exhibits a median size of greater than 30 µm, preferably of greater than 50 µm, and of less than 500 µm, preferably of less than 400 µm, preferably of less than 300 µm and preferably of less than 200 μm. In one embodiment, the median size is between 40 μm and 70 μm. In one embodiment, the median size is between 100 μm and 150 μm, the powder formed of aggregates exhibits a maximum size of less than 1 mm, preferably of less than 750 μm, the powder formed of aggregates exhibits a $D_{10}$ percentile of greater than 5 μm, preferably of greater than 10 μm and preferably of greater than 20 μm, the powder formed of aggregates exhibits a ratio $(D_{90}-D_{10})/D_{50}$ of less than 10, preferably of less than 5, indeed even of less than 3, indeed even of less than 2. Advantageously, the flowability of the powder is improved thereby, preferably, the aggregates comprise boron nitride platelets which are randomly oriented. The properties of the said aggregates are then essentially isotropic.

The term "median size" of a collection of aggregates (or of grains), denoted $D_{50}$, refers to the size dividing the aggregates (the grains) of this collection into a first population and a second population equal in weight, this first population and this second population comprising only aggregates (grains) respectively exhibiting a size of greater than or less than the said median size.

The terms 10 (denoted $D_{10}$), 90 (denoted $D_{90}$) and 99.5 (denoted $D_{99.5}$) "percentiles" refer to the sizes of aggregates (grains) corresponding to the percentages respectively equal to 10%, 90% and 99.5% by weight on the cumulative particle size distribution curve of the sizes of aggregates (grains) of the powder, the said sizes of aggregates (grains) being classified by increasing order. According to this definition, 10% by weight of the aggregates of the powder thus have a size of less than $D_{10}$ and 90% of the aggregates, by weight, have a size of greater than $D_{10}$. The percentiles are determined using a particle size distribution produced using a laser particle sizer.

The term "maximum size" of a powder refers to the 99.5 percentile.

The particle size distribution of the powders formed of aggregates (of grains) according to the invention is, for example, determined by laser scattering on a Camsizer particle sizer sold by Retsch Technologies, without suspending the said powder beforehand. The median size $D_{50}$, the 10 percentile ($D_{10}$) and the 90 percentile ($D_{90}$), and also the maximum size ($D_{99.5}$), are determined conventionally from this particle size distribution.

The invention also relates to the process for the manufacture of such a powder.

A first possible process for the manufacture of a powder formed of aggregates according to the invention comprises the following stages:
a) preparation of a starting feedstock, the composition of which is adapted so as to obtain, on conclusion of stage g), a powder formed of aggregates according to the invention, the said starting feedstock comprising a powder formed of boron nitride grains, the oxygen content of which is less than or equal to 10% by weight and the calcium content of which is less than 400 ppm by weight,
b) optionally, grinding the said starting feedstock,
c) shaping the starting feedstock into the form of a block exhibiting a relative density of greater than or equal to 60%,
d) grinding the said block so as to obtain agglomerates,
e) burnishing the agglomerates obtained at the end of stage d) so that they exhibit a circularity of greater than or equal to 0.90,
f) optionally, particle size selection of the agglomerates,
g) sintering the agglomerates at a sintering temperature of greater than 1600° C. and of less than 2100° C., in an inert or weakly reducing atmosphere, and obtaining the aggregates according to the invention,
h) optionally, particle size selection of the aggregates.

A second alternative process for the manufacture of a powder formed of aggregates according to the invention comprises the following stages:
a') preparation of a starting feedstock, the composition of which is adapted so as to obtain, on conclusion of stage f'), aggregates according to the invention, the said starting feedstock comprising grains of boron nitride, the powder formed of grains of boron nitride exhibiting an oxygen content of less than or equal to 10% by weight and a calcium content of less than 400 ppm by weight,
b') optionally, grinding the said starting feedstock,
c') shaping the starting feedstock into the form of a block exhibiting a relative density of greater than or equal to 60%,
d') sintering the said block at a sintering temperature of greater than 1600° C. and of less than 2100° C., in an inert or weakly reducing atmosphere,
e') grinding the said block so as to obtain aggregates,
f') burnishing the aggregates obtained at the end of stage e') so that they exhibit a circularity of greater than or equal to 0.90,
g') optionally, particle size selection of the aggregates.

Details as regards the stages of the processes described above are given below:

In the part which follows, as in the whole of the description, all the percentages are given by weight, unless expressly indicated otherwise.

In stage a) or a'), a starting feedstock, comprising one or more powders formed of boron nitride and optionally of additives for the sintering of the boron nitride, is prepared at ambient temperature.

The powders formed of additives for the sintering of the boron nitride can also be replaced, at least partially, with powders formed of precursors of these sintering additives, which are introduced in equivalent amounts.

The boron nitride powder or powders are preferably chosen so that:
the total content of "other elements" is less than 5%, preferably less than 4%, preferably less than 3%, preferably less than 2% and preferably less than 1%, as percentage by weight on the basis of the starting feedstock,
the total calcium content is less than 300 ppm by weight, indeed even less than 200 ppm by weight, on the basis of the starting feedstock,
the total oxygen content is less than 8%, preferably less than 6%, preferably less than 5%, preferably less than 4%, preferably less than 2%, preferably less than 1.5% and preferably less than 1%, as percentage by weight on the basis of the starting feedstock.

The starting feedstock contains a boron nitride powder in an amount of greater than 90%, preferably of greater than 92%, preferably of greater than 94% and preferably of greater than 96%, by weight on the basis of the weight of the starting feedstock.

In a preferred embodiment, no powder other than those contributing the boron nitride and optionally the additives for the sintering of the boron nitride and/or the precursors of such sintering additives is deliberately introduced into the starting feedstock, the other elements being impurities.

In a very preferred embodiment, no powder other than that contributing the boron nitride is deliberately introduced into the starting feedstock.

Preferably, the powders used in the starting feedstock exhibit a median size of less than 5 microns, preferably of less than 2 microns and preferably of less than 1 micron. Advantageously, the homogeneity of the aggregates of the powder according to the invention is improved thereby and/or the sintering is facilitated thereby. Preferably, if the starting feedstock exhibits a median size of greater than 10 microns, the process comprises a stage b) or b').

The starting feedstock can additionally comprise a solvent, preferably water, the amount of which is suitable for the shaping method of stage c) or c').

The starting feedstock can also comprise an organic shaping additive, chosen in particular from the group consisting of plasticizers, such as PEG or PVA, binders, including temporary organic binders, such as resins, lignosulphonates, carboxymethylcellulose or dextrin, deflocculants, such as polyacrylates, and the mixtures of these products, the amount of which is suitable for the shaping method of stage c) or c').

As is well known to a person skilled in the art, the starting feedstock is suitable for the shaping process of stage c) or c').

In the optional stage b) or b'), grinding can be carried out, under dry conditions, such as, for example, in a ball mill, or in a wet medium, such as, for example, in an attrition mill. After grinding in a wet medium, the ground starting feedstock is preferably dried.

In stage c) or c'), the starting feedstock is shaped into the form of a block by any technique known to a person skilled in the art, in particular by pressing, so that the relative density of the said block is greater than 60%, preferably greater than 65%, preferably greater than 70%, indeed even greater than 75%, indeed even greater than 80%.

In stage d), the block obtained at the end of stage c) is subjected to grinding according to any technique known to a person skilled in the art.

In stage d'), the block is sintered at a temperature of between 1600° C. and 2100° C., preferably between 1800° C. and 2100° C., in an inert or reducing atmosphere, preferably under argon, under nitrogen or under vacuum, preferably under nitrogen or under argon.

In stage e'), the block obtained at the end of stage d') is subjected to grinding according to any technique known to a person skilled in the art.

In stage e) or f'), the agglomerates are burnished according to any technique known to a person skilled in the art, preferably using a mill, preferably using a ball mill.

In the optional stage f) or g'), the agglomerates obtained at the end of stage e) or f') can be subjected to particle size selection according to any technique known to a person skilled in the art, for example by sieving, cycloning or air classification, preferably by sieving.

In stage g), the agglomerates or the block are sintered at a temperature of between 1600° C. and 2100° C., preferably between 1800° C. and 2100° C., in an inert or reducing atmosphere, preferably under argon, under nitrogen or under vacuum, preferably under nitrogen or under argon, this stage making it possible to obtain aggregates according to the invention.

In the optional stage h), the aggregates can be subjected to particle size selection according to any technique known to a person skilled in the art.

During an optional stage, subsequent to stage h) or g'), the aggregates can be subjected to a stage of functionalization of their surface, in particular by coupling agents or dispersing agents, such as, for example, silanes, siloxanes or long-chain carboxylic acids, such as stearic acid or lactic acid. This functionalization stage advantageously makes it possible to improve the dispersion and/or the adhesion of the sintered aggregates in a polymer matrix.

The invention also relates to the use of a powder formed of aggregates according to the invention as described above, in particular manufactured according to a process as described above, as filler in a polymer.

Finally, the invention relates to a polymer comprising a powder formed of sintered aggregates according to the invention, that is to say a polymer-ceramic or particulate-filled polymer composite, in which aggregates as described above are dispersed in a polymer matrix.

Preferably, in the composite according to the invention, the content by weight of aggregates is greater than 20%, preferably greater than 30%, and preferably less than 80%, preferably less than 70%, on the basis of the weight of the particulate-filled polymer.

In such a particulate-filled polymer, the polymer can in particular be chosen from thermosetting polymers or thermoplastic polymers. Preferably, the polymer is chosen from thermosetting polymers. More preferably, the thermosetting polymer is chosen from epoxy resins and silicones. The thermoplastic polymer is preferably chosen from polytetrafluoroethylene or PTFE, polyphenylene sulphide or PPS, polyetheretherketone or PEEK, polybutylene terephthalate or PBT, nylons, polycarbonates and elastomers.

Without departing from the scope of the invention, the powder essentially composed of aggregates based on boron nitride according to the invention can be mixed beforehand, before it is introduced into the said polymer, with another powder, for example a powder formed of alumina aggregates. In other words, the present invention also relates to any pulverulent mixture comprising the powder essentially composed of aggregates based on boron nitride described above.

A better understanding of the invention and its advantages will be obtained on reading the following exemplary embodiments, provided solely for illustrative purposes and without implied limitation of the present invention.

The powder formed of aggregates of boron nitride according to Comparative Example 1 is a PCTL5MHF powder sold by Saint-Gobain Boron Nitride.

The powder formed of aggregates of boron nitride according to Comparative Example 2 is a PCTH7MHF powder sold by Saint-Gobain Boron Nitride.

The powder formed of aggregates of boron nitride according to Comparative Example 3 is manufactured using the following process: a boron nitride powder, exhibiting a content of oxygen equal to 5% by weight, a content of calcium equal to 100 ppm and a content of elements other than oxygen and calcium of less than 1% by weight, is dry ground in a ball mill so that it exhibits a median size equal to 3 µm. The powder is subsequently sieved over a sieve with a mesh opening equal to 80 microns and then compressed into the form of pellets with a diameter of 50 mm on an isostatic press at a pressure of 200 MPa. The relative density of the pellets obtained is equal to 45%. The pellets obtained are subsequently ground using a roll mill, then burnished for 1 hour in a ball mill from which the balls have been removed, the said mill rotating at a speed equal to 5 rev/min, then sieved, with application of ultrasound, at 200 µm and at 80 µm, and finally heat treated under nitrogen in a cycle exhibiting a rate of rise of 100° C./h to 2000° C., a maintenance time at this temperature of 2 h and a downward gradient of 300° C./h. The powder thus obtained is in the end sieved so as to retain the particle size band between 80 μm and 200 μm.

The powder formed of aggregates of boron nitride according to Example 4, in accordance with the present invention, is manufactured using the following process: a boron nitride powder Saint-Gobain Boron Nitride PUHP30005, exhibiting a content of oxygen equal to 1% by weight, a content of calcium equal to 100 ppm and a median size equal to 1 μm, is sieved over an 80 micron sieve and then compressed into the form of pellets with a diameter of 50 mm on an isostatic press at a pressure of 200 MPa. The relative density of the pellets obtained is equal to 75%. The pellets obtained are subsequently ground using a roll mill, then burnished for 1 hour in a ball mill from which the balls have been removed, the said mill rotating at a speed equal to 5 rev/min, then sieved, with application of ultrasound, at 200 μm and at 80 μm, and finally heat treated under nitrogen in a cycle exhibiting a rate of rise of 100° C./h to 2000° C., a maintenance time at this temperature of 2 h and a downward gradient of 300° C./h. The powder thus obtained is in the end sieved so as to retain a particle size band between 80 μm and 200 μm.

The powder formed of aggregates of boron nitride according to Example 5, in accordance with the present invention, is manufactured using the following process: a boron nitride powder, exhibiting a content of boron nitride equal to 95% by weight, a content of oxygen equal to 4% by weight, a content of calcium equal to 300 ppm and a median size equal to 3 μm, is sieved over an 80 micron sieve and then compressed into the form of pellets with a diameter of 50 mm on an isostatic press at a pressure of 200 MPa. The relative density of the pellets obtained is equal to 80%. The pellets obtained are subsequently ground using a roll mill, then burnished for 1 hour in a ball mill from which the balls have been removed, the said mill rotating at a speed equal to 5 rev/min, then sieved, with application of ultrasound, at 200 μm and at 80 μm, and finally heat treated under nitrogen in a cycle exhibiting a rate of rise of 100° C./h to 2000° C., a maintenance time at this temperature of 2 h and a downward gradient of 300° C./h. The powder thus obtained is in the end sieved so as to retain a particle size band between 80 μm and 200 μm.

The powder formed of aggregates of boron nitride according to Example 6, in accordance with the present invention, is manufactured using the following process: a boron nitride powder, exhibiting a content of boron nitride equal to 92% by weight, a content of oxygen equal to 8% by weight, a content of calcium equal to 10 ppm and a median size equal to 3 μm, is sieved over an 80 micron sieve and then compressed into the form of pellets with a diameter of 50 mm on an isostatic press at a pressure of 200 MPa. The relative density of the pellets obtained is equal to 65%. The pellets obtained are subsequently ground using a roll mill, then burnished for 1 hour in a ball mill from which the balls have been removed, the said mill rotating at a speed equal to 5 rev/min, then sieved, with application of ultrasound, at 200 μm and at 80 μm, and finally heat treated under nitrogen in a cycle exhibiting a rate of rise of 100° C./h to 2000° C., a maintenance time at this temperature of 2 h and a downward gradient of 300° C./h. The powder thus obtained is in the end sieved so as to retain a particle size band between 80 μm and 200 μm.

The characteristics of the powders of Examples 1 to 6, after elemental, structural and physical analyses carried out by means of the techniques described above, are combined in Table 1 below.

TABLE 1

|  | 1(*) | 2(*) | 3(*) | 4 | 5 | 6 |
|---|---|---|---|---|---|---|
| Chemical analysis (data by weight) | | | | | | |
| B (%) | 43 | 43 | 43 | 43 | 43 | 43 |
| N (%) | 56 | 56 | 56 | 56 | 56 | 56 |
| Ca (ppm) | 500 | 300 | 20 | 20 | 300 | 10 |
| Other elements (%) | <1 | <1 | <1 | <1 | <1 | <1 |
| Including O (ppm) | 1000 | 1000 | 1000 | 1000 | 1000 | 1000 |
| Including C (ppm) | 100 | 100 | 100 | 100 | 100 | 100 |
| Facing crystalline phases and amount as % on the basis of the crystalline phases | | | | | | |
| Boron nitride | 100 | 100 | 100 | 100 | 100 | 100 |
| Other physical characteristics | | | | | | |
| Circularity | 0.77 | 0.75 | 0.9 | 0.93 | 0.95 | 0.95 |
| Apparent porosity (%) | 57 | 50 | 58 | 48 | 53 | 50 |
| Median pore size (μm) | 0.75 | 0.7 | 0.16 | 0.18 | 0.45 | 1.2 |
| $D_{50}$ of the aggregates (μm) | 80 | 100 | 110 | 90 | 130 | 107 |

(*)outside the invention

The content of boron oxide, as measured by mannitol titration, is of the order of 0.1% for all the examples.

The wear by attrition of the powders obtained according to Examples 1 to 6 is subsequently estimated using the following test: 20 g of powder formed of aggregates passing through the meshes of a sieve with an opening equal to 200 μm and not passing through the meshes of a sieve with an opening equal to 80 μm are placed in a closed nylon container, so that the said powder occupies 45% of the volume of the said container. The container is subsequently agitated for 120 minutes at a rotational speed equal to 20 rev/min in a jar mill. After the test, the weight of particles passing through the meshes of a sieve with an opening equal to 80 μm is determined. It corresponds to the amount of fine particles created during the test. This amount of fine particles generated, or "wear by attrition", is expressed as percentage of the weight of the powder before the test. The higher the said amount of fine particles generated during the test, the greater the wear by attrition of the powder formed of aggregates.

It is considered that a wear by attrition of greater than 20% results in a substantial decrease in the thermal conductivity of the particulate-filled polymer comprising the said aggregates. Preferably, the wear by attrition is less than 15% and preferably less than 10%.

The decrease in the wear by attrition of a powder formed of aggregates B with respect to a powder formed of aggregates A is equal to the difference in the wear by attrition of the powder A and of the wear by attrition of the powder B, divided by the wear by attrition of the powder A, expressed as percentage, the powder A being the powder regarded as reference.

The powders obtained according to Examples 1 to 6 are subsequently used as filler in an ordinary polymer matrix of the silicone resin TSE3033 type sold by Momentive Performance Materials. The inclusion and the dispersion of the aggregates in the polymer matrix are carried out according to the following protocol:

Each powder is dispersed in the silicone resin TSE3033 (the two parts A and B of the resin being mixed in equal amounts by weight) at ambient temperature in a Rayneri VMI Turbotest mixer sold by VMI, with a rotational speed equal to 200 revolutions per minute. The weight of powder introduced is equal to 40%, on the basis of the sum of the weight of the silicone resin TSE3033 and of the weight of the powder. Each mixture thus obtained is subsequently poured so as to obtain a film exhibiting a thickness equal to 5 mm. The said film is subsequently heated at a temperature equal to 100° C. for a time equal to 2 hours.

Through-plane thermal conductivity measurements are carried out on each polymer film obtained, the through-plane thermal conductivity denoting the thermal conductivity measured along the direction perpendicular to the polymer film, in other words measured along the thickness of the said film.

The measurements are carried out according to the following standards and experimental protocols: The thermal conductivity is given conventionally by the product of the diffusivity, the density and the heat capacity.

More particularly, the through-plane thermal conductivity is measured by the product of the through-plane thermal diffusivity, the density and the heat capacity.

The thermal diffusivity of the polymers is measured according to Standard ASTM C-518 by the heat flows method. The diffusivity is measured perpendicularly to the polymer layer (through-plane thermal diffusivity).

The heat capacity of the polymers is measured by differential scanning calorimetry (DSC) on a Netzsch thermobalance. The density of the polymers is measured by helium pycnometry.

The improvement in the thermal conductivity of a particulate-filled polymer comprising a powder formed of aggregates B, with respect to a particulate-filled polymer comprising a powder formed of aggregates A, is equal to the difference in the thermal conductivity of the particulate-filled polymer comprising the powder B and in the thermal conductivity of the particulate-filled polymer comprising the powder A, divided by the thermal conductivity of the particulate-filled polymer comprising the powder A, expressed as percentage (the particulate-filled polymer comprising the powder A being the reference particulate-filled polymer).

The results of the tests of wear by attrition of the powders formed of aggregates and of the thermal conductivity measurements appear in the following Table 2:

TABLE 2

| Example | Circularity | Apparent porosity (%) | Median pore size (μm) | Calcium content (ppm) | Wear by attrition (%) | Decrease in the wear by attrition of the powder of the example/powder according to Example 1 | Thermal conductivity of the polymer charged with the powder formed of granules of the example (W/m · K) | Improvement in the thermal conductivity of the polymer charged with the powder of the example/polymer charged with the powder according to Example 1 |
|---|---|---|---|---|---|---|---|---|
| 1(*) | 0.77 | 57 | 0.75 | 500 | 31 | — | 0.5 | — |
| 2(*) | 0.75 | 50 | 0.7 | 300 | 23 | −26% | 0.8 | +60% |
| 3(*) | 0.9 | 58 | 0.16 | 20 | 25 | −19% | 0.5 | 0 |
| 4 | 0.93 | 48 | 0.18 | 20 | 7 | −77% | 1 | +100% |
| 5 | 0.95 | 53 | 0.45 | 300 | 11 | −65% | 0.9 | +80% |
| 6 | 0.95 | 50 | 1.2 | 10 | 14 | −55% | 0.9 | +80% |

(*)outside the invention

The data given in Table 2 show that the powders formed of aggregates based on boron nitride according to the invention of Examples 4, 5 and 6 exhibit a wear by attrition measured at 7%, 11% and 14% respectively and that the particulate-filled polymer obtained from the said powders formed of aggregates based on boron nitride according to the invention of Examples 4, 5 and 6 exhibits a through-plane thermal conductivity which is much greater than that of all the other samples.

More specifically, the powder formed of aggregates according to Example 1 in accordance with the teaching of the document WO2014/136959 does not satisfy the desired compromise: in particular, the wear by attrition appears higher than that of Examples 4 to 6 according to the invention.

Neither is the best compromise satisfied by the powder formed of aggregates according to Example 2 (outside the invention) and for the particulate-filled polymer comprising the said powder: although lower than that of Example 1, the wear by attrition of the powder formed of aggregates is still too high. However, the thermal conductivity of the particulate-filled polymer comprising the said powder is substantially greater (by 60%) than that of the particulate-filled polymer comprising the powder according to Example 1.

As regards the powder formed of aggregates according to Example 3 (outside the invention) not comprising calcium and the particulate-filled polymer comprising the said powder, it is found that the wear by attrition of the powder formed of aggregates is still too high and that the thermal conductivity of the particulate-filled polymer comprising the said powder is not improved with respect to that of the particulate-filled polymer comprising the powder according to Example 1.

The best results and compromises are obtained for the powders formed of aggregates according to Examples 4, 5 and according to the invention and the particulate-filled polymer comprising the said powders: the wear by attrition of the powder formed of aggregates of Examples 4, 5 and 6 is limited to only 7%, 11% and 14% respectively, that is to say much lower than the wear by attrition of the powders formed of aggregates of Comparative Examples 1, 2 and 3. The thermal conductivity of the particulate-filled polymer comprising the polymer formed of aggregates according to Examples 4, 5 and 6 is greater than the thermal conductivity of the particulate-filled polymer comprising the powder formed of aggregates of Comparative Examples 1, 2 and 3. Example 4 is the particularly preferred example: the wear by attrition of the powder formed of aggregates of this example is the lowest of the wear values measured on the powders of the examples, and the thermal conductivity of the particulate-filled polymer comprising the powder formed of aggregates of the said Example 4 is in particular of the order of twice that of the particulate-filled polymer comprising the powder according to Example 1 and in absolute terms the highest of all the samples tested.

A comparison between the powders formed of aggregates of Examples 1 and 4 thus makes it possible to demonstrate the significant improvement obtained according to the invention by a specific adjustment of the parameters of apparent porosity, calcium content, circularity of the aggregates and mean pore size.

In particular, from the viewpoint of the teaching of the prior publication WO2014/136959 described above, the Applicant Company has demonstrated the cumulative impact of the decrease in the mean pore size, of the decrease in the calcium content, of the decrease in the apparent porosity and of the increase in the circularity on the properties of resistance to attrition and of thermal conductivity of the particulate-filled polymer comprising the said powders.

In particular, if Example 1 (according to WO2014/136959) and Example 4 (according to the invention) are compared, it is found that:
the wear by attrition decreases from 31% to 7%, i.e. a decrease equal to 77%,
the thermal conductivity of the particulate-filled polymer increases from 0.5 to 1 W/m·K and is improved by 100%.

Unexpectedly, in the light of the better compromise obtained by virtue of their adjustment in accordance with the present invention, the Inventors have thus demonstrated a true synergy between the characteristics of circularity, apparent porosity, mean pore size and calcium content.

The invention claimed is:

1. A powder essentially composed of aggregates based on boron nitride, said powder exhibiting:
a) the following overall chemical composition, as percentages by weight:
between 40 and 45% of boron, limits included,
between 53 and 57% of nitrogen, limits included,
a calcium content of less than 400 ppm by weight,
less than 5%, in total, of other elements;
b) a structural composition comprising more than 90% of boron nitride, limit included, as percentage by weight and on the basis of the combined crystalline phases present in said powder,
c) the following physical characteristics:
a mean circularity of greater than or equal to 0.90,
a median pore size of less than or equal to 1.5 µm,
an apparent porosity of less than or equal to 55%.

2. The powder according to claim 1, exhibiting a median pore size of less than or equal to 0.3 µm.

3. The powder according to claim 1, exhibiting the following overall chemical composition:
a boron content of greater than or equal to 41% and of less than or equal to 44%,
a nitrogen content of greater than or equal to 54% and of less than or equal to 56%,
a calcium content of less than 300 ppm by weight.

4. The powder according to claim 1, exhibiting a chemical composition in which the content by weight of elements other than B, N and Ca is less than 4%, and in which the oxygen content is less than 5000 ppm by weight.

5. The powder according to claim 1, exhibiting a chemical composition in which the other elements comprise an additive for the sintering of the boron nitride, in an amount of greater than or equal to 0.5% and of less than 4%.

6. The powder according to claim 5, wherein the additive for the sintering of the boron nitride is chosen from $LaB_6$; oxides of rare earth metals, of elements from Groups 3 and 4 of the Periodic Table of the Elements and of their mixtures; nitrides of the elements from Group 4 of the Periodic Table of the Elements; and their mixtures.

7. The powder according to claim 1, wherein the structural composition comprises more than 95% of boron nitride, as percentage by weight and on the basis of the combined crystalline phases present in the powder.

8. The powder according to claim 1, exhibiting a structural composition in which the boron nitride is present for more than 60% under a hexagonal structure, as percentage by weight and on the basis of the crystalline boron nitride phases present in the powder.

9. The powder according to claim 1, exhibiting a mean circularity of greater than or equal to 0.92.

10. The powder according to claim 1, exhibiting a median pore size of less than or equal to 0.25 µm and of greater than 0.05 µm.

11. The powder according to claim 1, exhibiting an apparent porosity of less than 50%.

12. The powder according to claim 1, exhibiting a median size of greater than 30 µm and of less than 500 µm.

13. A process for the manufacture of a powder essentially composed of aggregates based on boron nitride, said powder exhibiting:
a) the following overall chemical composition, as percentages by weight:
between 40 and 45% of boron, limits included,
between 53 and 57% of nitrogen, limits included,
a calcium content of less than 400 ppm by weight,
less than 5%, in total, of other elements;
b) a structural composition comprising more than 90% of boron nitride, limit included, as percentage by weight and on the basis of the combined crystalline phases present in said powder,
c) the following physical characteristics:
a mean circularity of greater than or equal to 0.90,
a median pore size of less than or equal to 1.5 µm,
an apparent porosity of less than or equal to 55%,
the process comprising the following stages:
a) preparing a starting feedstock, the composition of which is adapted so as to obtain the powder on conclusion of stage g), the starting feedstock comprising boron nitride grains, the powder formed of boron nitride grains exhibiting an oxygen content of less than or equal to 10% by weight and a calcium content of less than 400 ppm by weight,
b) optionally, grinding the starting feedstock,
c) shaping the starting feedstock into the form of a block exhibiting a relative density of greater than or equal to 60%,
d) grinding the block so as to obtain agglomerates,
e) burnishing the agglomerates obtained at the end of stage d) so that the agglomerates exhibit a circularity of greater than or equal to 0.90,
f) optionally, particle size selection of the agglomerates,
g) sintering the agglomerates at a sintering temperature of greater than 1600° C. and of less than 2100° C., in an inert or weakly reducing atmosphere,
h) optionally, particle size selection of the aggregates.

14. A process for the manufacture of a powder essentially composed of aggregates based on boron nitride, said powder exhibiting:
a) the following overall chemical composition, as percentages by weight:
between 40 and 45% of boron, limits included,
between 53 and 57% of nitrogen, limits included,
a calcium content of less than 400 ppm by weight,
less than 5%, in total, of other elements;
b) a structural composition comprising more than 90% of boron nitride, limit included, as percentage by weight and on the basis of the combined crystalline phases present in said powder,
c) the following physical characteristics:
a mean circularity of greater than or equal to 0.90,
a median pore size of less than or equal to 1.5 μm,
an apparent porosity of less than or equal to 55%,
the process comprising the following stages:
a') preparing a starting feedstock, the composition of which is adapted so as to obtain the powder on conclusion of stage f'), the starting feedstock comprising grains of boron nitride, the powder formed of grains of boron nitride exhibiting an oxygen content of less than or equal to 10% by weight and a calcium content of less than 400 ppm by weight,
b') optionally, grinding the starting feedstock,
c') shaping the starting feedstock into the form of a block exhibiting a relative density of greater than or equal to 60%,
d') sintering the block at a sintering temperature of greater than 1600° C. and of less than 2100° C., in an inert or weakly reducing atmosphere,
e') grinding the block so as to obtain aggregates,
f') burnishing the aggregates obtained at the end of stage e') so that the aggregates exhibit a circularity of greater than or equal to 0.90,
g') optionally, particle size selection of the aggregates.

15. The process according to claim 13, wherein, in stage a), the total calcium content is less than 300 ppm by weight and/or the total oxygen content is less than 5%, as percentage by weight on the basis of the starting feedstock.

16. The process according to claim 13, wherein, in stage c), the starting feedstock is shaped into the form of a block so that the relative density of the block is greater than 65%.

17. A particulate-filled polymer comprising a polymer in which a powder essentially composed of aggregates based on boron nitride is dispersed, said powder exhibiting:
a) the following overall chemical composition, as percentages by weight:
between 40 and 45% of boron, limits included,
between 53 and 57% of nitrogen, limits included,
a calcium content of less than 400 ppm by weight,
less than 5%, in total, of other elements;
b) a structural composition comprising more than 90% of boron nitride, limit included, as percentage by weight and on the basis of the combined crystalline phases present in said powder,
c) the following physical characteristics:
a mean circularity of greater than or equal to 0.90,
a median pore size of less than or equal to 1.5 μm,
an apparent porosity of less than or equal to 55%.

18. The particulate-filled polymer according to claim 17, wherein the polymer is chosen from epoxy resins, silicones, polytetrafluoroethylene, polyphenylene sulphide, polyetheretherketone, polybutylene terephthalate, nylons, polycarbonates and elastomers.

19. The powder according to claim 3, wherein the calcium content is less than 200 ppm by weight.

20. The powder according to claim 4, exhibiting a chemical composition in which the content by weight of elements other than B, N and Ca is less than 2%, and in which the oxygen content is less than 2000 ppm by weight.

21. The powder according to claim 7, wherein the structural composition comprises more than 98% of boron nitride, as percentage by weight and on the basis of the combined crystalline phases present in the powder.

22. The powder according to claim 11, exhibiting an apparent porosity of less than 49%.

23. The process according to claim 13, wherein the total oxygen content is less than 2% as percentage by weight on the basis of the starting feedstock.

24. The process according to claim 13, wherein the relative density of the block is greater than 70%.

25. The process according to claim 14, wherein, in stage a'), the total calcium content is less than 300 ppm by weight and/or the total oxygen content is less than 5%, as percentage by weight on the basis of the starting feedstock.

26. The process according to claim 14, wherein, in stage c'), the starting feedstock is shaped into the form of a block so that the relative density of the block is greater than 65%.

* * * * *